United States Patent Office 3,164,617
Patented Jan. 5, 1965

3,164,617
17α-BUTADIYNYL-17β-HYDROXY DERIVATIVES OF PERHYDROCYCLOPENTENOPHENANTHRENE AND PROCESS FOR PREPARATION OF SAME
Peter Feather and Vladimir Petrow, London, England, assignors to The British Drug Houses Limited
No Drawing. Filed Jan. 29, 1963, Ser. No. 254,606
Claims priority, application Great Britain Feb. 2, 1962
28 Claims. (Cl. 260—397.4)

This invention is for improvements in or relating to organic compounds and has particular reference to a new class of steroidal materials, namely the 17α-butadiynyl-17β-hydroxy derivatives of perhydrocyclopentenophenanthrene and to a process of their preparation.

The new compounds of the present invention have valuable biological properties in that, in general, they have claudogenic properties (see Petrow, J. Pharm. Pharmacol., 1960, 12, 1704), or they may be readily converted into compounds having valuable biological properties. Thus, for example, they undergo catalytic hydrogenation to 17α-butyl-17β-hydroxy derivatives. They can have hormal properties including oestrogenic, progestational and ovulation inhibiting properties.

Thus 17α-butadiynyloestradiol 3-methyl ether has oestrogenic and claudogenic properties. Such compounds as 17α-butadiynylandrost-5-en-3β, 17β-diol and 17α-butadiynyl-6-methylandrost-5-en-3β,17β-diol have claudogenic properties and in particular anti-nidation properties without concomitant significant oestrogenic activity.

Other valuable 17α-butadiynyl-17β-hydroxy derivatives with claudogenic properties include derivatives of Oestra-1,3,5(10)-triene,
4-methyl-oestra-1,3,5(10)-triene,
19-norandrost-4-en,
19-norandrost-4-en-3-one,
Oestra-5(10)-en-3-one,
3-ethoxy-19-norandrosta-3,5-diene,
3-methoxy-6-methyl-19-norandrosta-3,5-diene,
4α-methyl-5α-androst-3-one,
4-methylandrost-4-en-3-one,
6α-methylandrost-4-en-3-one,
6α-methyl-5α-androstan-3-one,
5α-androstan-3-one,
Androsta-3,5-diene,
Androst-5-en-17-one.

Compounds having such properties are valuable in the veterinary field particularly for application to the dog and cat species. Thus unwanted litters in, for example, sheep dogs and pedigree animals and sometimes in domestic pets can be disadvantageous. By administration of one of the claudogenic compounds of the present invention the appearance of such unwanted litters may be prevented. Similarly in cats the administration of claudogenic compounds is often of value. Not only does such administration prevent the appearance of unwanted litters, but it eliminates the need for castration so that normal reproduction can take place if subsequently desired.

The claudogenic compounds of the present invention are of value for the control of infestation by domestically-encountered rodents especially rats and mice. For example, the 3-methyl derivative of 17α-butadiynyl oestradiol may be administered for this purpose in a suitable bait. An advantage of the claudogenic compounds of the present invention over the hitherto available rat and mouse poisons is the virtual absence of toxicity to domestic animals if the treated bait is accidentally consumed. This form of "claudogenic control" is an important advance in the control of rodent infestation.

It is an object of the present invention to provide new 17α-butadiynyl steroids having, apart from substiutents and unsaturated linkages in Rings A, B, C and D, the general formula

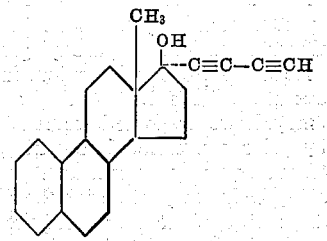

According to the present invention, there is provided a process for the preparation of 17α-butadiynyl steroids, having, apart from substituents and unsaturated linkages in Rings A, B, C and D, the general Formula I, which process comprises reacting the corresponding 17-oxo-steroid with a derivative of diacetylene in which one of the atoms of hydrogen has been replaced by an equivalent of a metal such as lithium, sodium, potassium, calcium or magnesium including the mono-Grignard derivatives, and subsequently regenerating the desired derivative from the complex so formed. Monosodio-butadiyne (Armitage, Jones and Whiting, J. Chem. Soc., 1952, 1993) is the preferred reagent.

Monosodio-butadiyne is conveniently prepared by treating 1,4-dichloro-but-2-yne (Reppe et al., Annalen, 1955, 596, 78) in a refluxing solution of liquid ammonia with 3 molecular proportions of sodamide preferably with exclusion of moisture. Somewhat less than one molecular proportion of the 17-oxo-steroidal material is preferably employed and if desired may be added in anhydrous solution in a non-hydroxylic organic solvent such as tetrahydrofuran to the prepared solution of monosodio-butadiyne in liquid ammonia. After addition is complete, the mixture is stirred, under reflux, e.g., for up to 2 hours, and the product is then liberated from the organometallic complex by methods of prior art applicable to reaction of this type, such for example, as adding solid ammonium chloride, allowing the ammonia to evaporate and treating the residue with water. The product is purified by careful recrystallization.

As is well-known to those skilled in the art, aliphatic derivatives of diacetylene are frequently of low stability (see Armitage, Jones and Whiting, J. Chem. Soc., 1952, 1993). We have made the surprising discovery that the product of the present invention are, in general, stable at room temperature in the atmosphere and in presence of diffuse daylight. An attempt to detonate 17α-butadiynyl-androst-5-en-3β,17β-diol was not successful, and a sample of the same substance, heated at 100° C. in the atmosphere for 24 hours showed no signs of decomposition.

We have found, however, that the melting point is not, in general, a satisfactory criterion of the purity or identity of the compounds of the present invention. For example, 17α-butadiynyl-androst-5-en-17β-ol fuses with decomposition at approximately 135° C., while 17α-butadiynyl-androst-5-en-3β,17β-diol decomposes without melting at approximately 215° C. In many cases, a melting point or temperature of decomposition is ill-defined, and its value depends upon the rate of heating. The purity of the product, however, can in general be established by such physical measurements as U.V. and I.R. determinations. The diacetylene chromophore may be characterised by bands in the region of 229 m$\mu$, 235.5 m$\mu$, 252 m$\mu$ (Armitage, Cook, Entwistle, Jones and Whiting, J. Chem. Soc., 1952, 1998).

It will be apparent to those skilled in the art that the process of the invention may be applied to steroids containing, in addition to the oxo-group at $C_{17}$, a variety of substituents and unsaturated linkages in Rings A, B, C and D. Thus, the process of the invention may be applied to steroids containing unsaturated linkages at $\Delta^1, \Delta^2, \Delta^3, \Delta^4, \Delta^{5(6)}, \Delta^7, \Delta^{9(11)}$ and $\Delta^{11(12)}$, and to combinations of unsaturated linkages such, for example, as at $\Delta^2$ and $\Delta^{5(10)}$. In addition, the process may be applied to steroids containing 3 or more unsaturated linkages, together forming an aromatic system which may be substituted by halogen if desired. Hydroxyl groups do not interfere with the process of the invention, in particular, hydroxyl groups at positions 2, 3, 4, 5, 6 and 11. Hydroxyl groups may, however, sometimes be advantageously protected by prior conversion into tetrahydropyranyl derivatives and subsequently regenerated. Acylated hydroxyl groups may be hydrolysed during the course of the reaction with the diacetylide, and may require subsequent regeneration. Alkyl, alkenyl and alkynyl groups containing up to five carbon atoms such, for example, as methyl, vinyl and propynyl groups, and in particular, methyl groups at $C_2$, $C_4$, $C_5$ and $C_6$, do not interfere with the process of the invention.

Oxo-groups for example at $C_3$, $C_4$ or $C_6$ require protection by ketal, thioketal, enamine or enol ether formation and subsequent regeneration. The 17α-butadiynyl-17β-hydroxy derivatives obtained from the 3-enol ethers of 3,17-dioxo-$\Delta^4$-steroids may also be of value in their own right on account of their biological properties and in particular their claudogenic properties. Sterically hindered oxo-groups, such as at $C_{11}$ when an unsaturated linkage is present in the molecule at $C_4$ or $C_5$, will, in general, prove unreactive. 5,6-epoxide groups do not interfere with the process of the invention.

The process of the invention is particularly applicable to derivatives of androstane represented as general Formulae II, III, IV and V, and of oestrane represented by general Formulae VI, VII and VIII

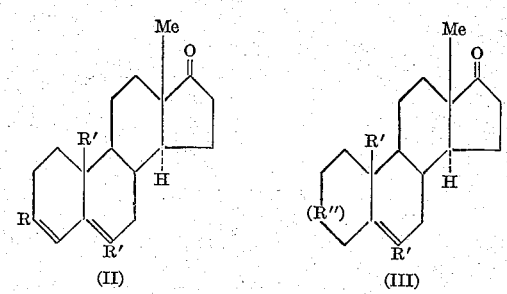

(II)     (III)

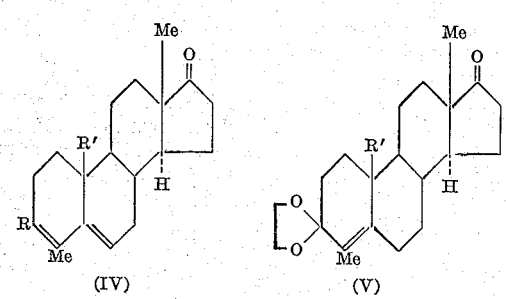

(IV)     (V)

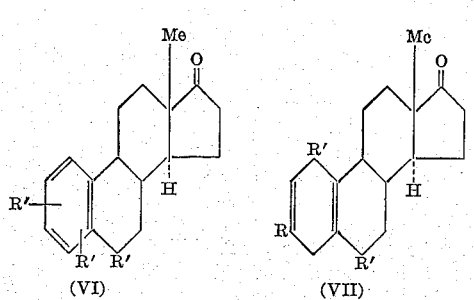

(VI)     (VII)

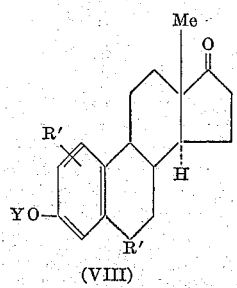

(VIII)

where R is OX (where X is lower alkyl, cyclic alkyl or benzyl), H or alkyl;
R' is Me or H
R'' is

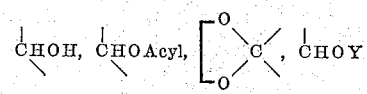

Y is X or tetrahydropyranyl.

In a typical preparation of a 17α-butadiynyl steroid containing a 3-oxo-4-ene grouping and a 17-oxo group, a 3-ketal may first be prepared by heating with an excess of ethylene glycol in the presence of p-toluene sulphonic acid, the water formed in the reaction being continuously removed (cf. Herzog, Jevnik, Tully and Hershberg, J. Amer. Chem. Soc., 1953, 75, 4425). The resulting ketal is then treated with the diacetylide derivative. The ketal group is removed by hydrolysis usually in the presence of an acid catalyst yielding the 17α-butadiynyl-17β-hydroxy-androst-4-en-3-one derivative.

Alternatively, a 17β-hydroxy-3-oxo-$\Delta^4$-steroid may be converted into a derivative such as a 3-ketal or 3-enol ether and the secondary hydroxylic group at $C_{17}$ converted into a 17-oxo group by oxidation with, for example, chromic acid/pyridine. The 17-oxo-3-ketalised or enolised steroid thereby obtained may then be condensed with the diacetylide derivative as described above.

A procedure applicable to and particularly convenient for 3,17-dioxo-$\Delta^4$-steroids is to convert them into the 3-enol ether-17-ones by methods of prior art and to condense these materials with the acetylide, subsequently regenerating the 3-oxo-$\Delta^4$-system by treatment with $H^+$ ions.

In the preparations of the 3-oxo-$\Delta^4$-derivatives of 17α-butadiynyl-19-nor-androstane, the readily available oestra-2,5(10)-dien-3-ol-17-one-3-methyl ether may be treated with the diacetylide according to the process of the invention. Warming with a mineral acid then regenerates the 3-oxo-4-ene grouping. The 3-enol ethers of a 19-nor-androst-4-ene-3,17-dione may also be employed.

In certain cases it may be advantageous to reduce an oxo group (other than at $C_{17}$) to hydroxyl and subsequently to regenerate it by oxidation.

The present invention provides veterinary preparations of the new 17α-butadiynyl-17β-hydroxy steroidal derivatives. Oral forms of administration are preferred to injectable preparations. In particular the products of the invention may be administered as tablets or as food additives.

The process of the invention may be applied to give the following compounds:

17α-butadiynyl-oestra-1,3,5(10)-trien-3,17β-diol
17α-butadiynyl-oestra-1,3,5(10)-trien-3,17β-diol-3-methyl ether
17α-butadiynyl-oestra-1,3,5(10)-trien-3,17β-diol-3-ethyl ether
17α-butadiynyl-oestra-1,3,5(10)-trien-3,17β-diol-3-allyl ether
17α-butadiynyl-oestra-1,3,5(10)-trien-3,17β-diol-3-benzyl ether
17α-butadiynyl-oestra-1,3,5(10)-trien-3,17β-diol-3-di-ethyl-aminoethyl ether 17α-butadiynyl-1-methyl-oestra-1,3,5(10)-trien-3,17β-diol
17α-butadiynyl-2-methyl-oestra-1,3,5(10)-trien-3,17β-diol
17α-butadiynyl-4-methyl-oestra-1,3,5(10)-trien-3,17β-diol
17α-butadiynyl-6β-methyl-oestra-1,3,5(10)-trien-3,17β-diol
17α-butadiynyl-1,2-dimethyl-oestra-1,3,5(10)-trien-3,17β-diol
17α-butadiynyl-1,6α-dimethyl-oestra-1,3,5(10)-trien-3,17β-diol
17α-butadiynyl-1,6β-dimethyl-oestra-1,3,5(10)-trien-3,17β-diol
17α-butadiynyl-1,2-dimethyl-oestra-1,3,5(10),6-tetraen-3,17β-diol
17α-butadiynyl-1,6-dimethyl-oestra-1,3,5(10),6-tetraen-3,17β-diol
17α-butadiynyl-4-methyl-oestra-1,3,5(10)-trien-1,17-diol
17α-butadiynyl-4,6α-dimethyl-oestra-1,3,5(10)-trien-1,17β-diol
17α-butadiynyl-oestra-1,3,5(10)-trien-17β-ol
17α-butadiynyl-1-methyl-oestra-1,3,5(10)-trien-17β-ol
17α-butadiynyl-4-methyl-oestra-1,3,5(10)-trien-17β-ol
17α-butadiynyl-1,4-dimethyl-oestra-1,3,5(10)-trien-17β-ol
17α-butadiynyl-2,4-dimethyl-oestra-1,3,5(10)-trien-17β-ol
17α-butadiynyl-2-chloro-4-methyl-oestra-1,3,5(10)-trien-17β-ol
17α-butadiynyl-5β-methyl-oestra-9(10)-en-3β,6β,17β-triol
17α-butadiynyl-3-methoxy-oestra-2,5(10)-dien-17β-ol
17α-butadiynyl-3-ethoxy-19-nor-androsta-3,5-dien-17β-ol
17α-butadiynyl-6-hydroxymethyl-3-methoxy-19-nor-androsta-3,5-dien-17β-ol
17α-butadiynyl-19-nor-androst-4-en-17β-ol-3-one
17α-butadiynyl-oestra-5(10)-en-17β-ol-3-one
17α-butadiynyl-3-methoxy-6-methyl-19-nor-androst-3,5-dien-17β-ol
17α-butadiynyl-6α-methyl-19-nor-androst-4-en-17β-ol-3-one
17α-butadiynyl-19-nor-androst-4-en-17β-ol
17α-butadiynyl-androst-4-en-17β-ol
17α-butadiynyl-androst-5-en-17β-ol
17α-butadiynyl-androsta-3,5-dien-17β-ol
17α-butadiynyl-2α-methyl-androst-4-en-17β-ol
17α-butadiynyl-androst-5-en-3β,17β-diol
17α-butadiynyl-6-methyl-androst-5-en-3β,17β-diol
17α-butadiynyl-androst-4-en-17β-ol-3-one
17α-butadiynyl-4-methyl-androst-4-en-17β-ol-3-one
17α-butadiynyl-6α-methyl-androst-4-en-17β-ol-3-one
17α-butadiynyl-5α-androstan-17β-ol-3-one
17α-butadiynyl-4α-methyl-5α-androstan-17β-ol-3-one
17α-butadiynyl-6α-methyl-5α-androstan-17β-ol-3-one
17α-butadiynyl-androst-4-en-17β-ol-3,11-dione
17α-butadiynyl-3-methoxy-androsta-3,5-dien-17β,11β-diol
17α-butadiynyl-androst-4-en-11β,17β-diol-3-one
17α-butadiynyl-androstan-3β,5α,6β,17β-tetrol
17α-butadiynyl-5α,6α-epoxy-androstan-3β,17β-diol
17α-butadiynyl-5β,6β-epoxy-androstan-3β,17β-diol
17α-butadiynyl-androst-4-en-17β-ol-3,6-dione
17α-butadiynyl-oestra-4,9(10)-dien-17β-ol-3-one Following is a description by way of example of methods of carrying the invention into effect.

EXAMPLE 1

*17α-Butadiynyl-Androst-5-En-3β,17β-Diol*

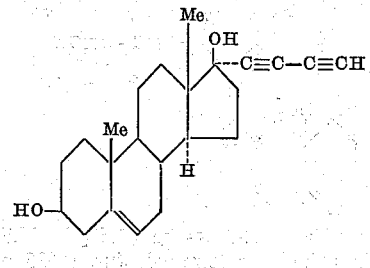

Sodium wire (3.45 g.) and ferric nitrate (0.05 g.) were added to liquid ammonia (200 ml.) and the mixture was stirred under reflux until the blue colour disappeared. 1,4-dichloro-but-2-yne (6.15 g.) was added dropwise, and after a further five minutes, a solution of dehydro-epi-androsterone (14.1 g.) in anhydrous tetrahydrofuran (100 ml.) was added. The mixture was stirred under reflux for 1½ hours, solid ammonium chloride (6 g.) was added, and the ammonia was allowed to evaporate. The residue was extracted with ether and the ethereal solution was washed with water, dried over sodium sulphate, treated with charcoal, and evaporated at reduced pressure. The solid residue was purified from methanol, yielding 17α-butadiynyl-androst-5-en-3β-diol, $[\alpha]_D^{23} = -170°$ (c., 0.742 in dioxan A.R.), $\lambda_{max.}^{EtOH}$ 229.5 mμ (ε 314), 241 mμ (ε 338.5), 254–254.5 mμ (ε 213)

$\gamma_{max.}^{Nujol}$ 3585, 3366, 3156, 2219, 2139, 1672, 1269, 1249, 1170, 1137, 1082, 1053, 1024, 954, 843, 739 and 725 cm.$^{-1}$

EXAMPLE 2

*17α-Butadiynyl-3-Methoxy-Oestra-1,3,5(10)-Trien-17β-Ol*

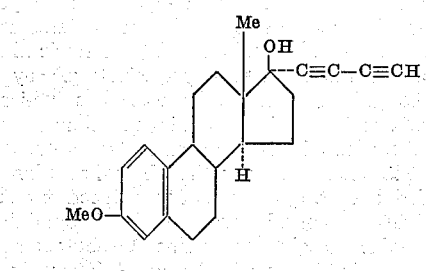

A solution of oestrone 3-methyl ether (13.5 g.) in anhydrous tetrahydrofuran (300 ml.) was added to a solution prepared from liquid ammonia (200 ml.), sodium (3.45 g.) ferric nitrate (0.05 g.) and 1,4-dichloro-but-2-yne (6.15 g.) by the method of Example 1. The mixture was stirred under reflux for 1 hour and treated with solid ammonium chloride (6 g.), and the ammonia was allowed to evaporate. Ether extraction, the ethereal solution being washed, dried, treated with charcoal, and evaporated at reduced pressure, yielded a gum which, purified from aqueous methanol and from ether/petroleum ether gave crystalline 17α-butadiynyl-3-methoxy-oestra-1,3,5(10)-trien-17β-ol $[\alpha]_D^{23} = -35°$ (c., 0.966 in EtOH pure):

$\lambda_{max.}^{EtOH}$ 278.5 mμ (ε 1,930) and 287.5 mμ (ε 1,830); $\lambda_{inf.}^{EtOH}$ 256 mμ (ε 528); $\gamma_{max.}^{CCl_4}$ 3609, 3310, 2229, 2059, 1611, 1466, 1455, 1383 cm.$^{-1}$

EXAMPLE 3

*17α-Butadiynyl-Androst-5-En-17β-Ol*

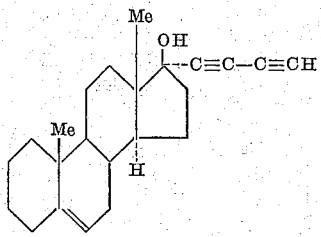

A solution of androst-5-en-one (4.6 g.) (U.S. Patent 2,397,424) in anhydrous tetrahydrofuran (35 ml.) was added to a solution prepared from liquid ammonia (100 ml.), sodium (1.17 g.), ferric nitrate (0.02 g.) and 1,4-dichloro-but-2-yne (2.08 g.) by the method of Example 1. The mixture was stirred under reflux for 2 hours and treated with solid ammonium chloride (2 g.), and the ammonia was allowed to evaporate. Ether extraction, the ethereal solution being washed, dried, and evaporated at reduced pressure, yielded a gum which, purified from aqueous methanol, gave crystalline 17α-butadiynyl-androst-5-en-17β-ol, $[\alpha]_D^{22} = -185°$ (c. 0.568 in dioxan A.R.), $\gamma_{max.}^{CCl_4}$ 3607, 3310, 2221, 2057, 1666, 1457, 1438, and 1382 cm.$^{-1}$

EXAMPLE 4

*17α-Butadiynyl-3-Methoxy-Oestra-2,5(10)-Dien-17β-Ol*

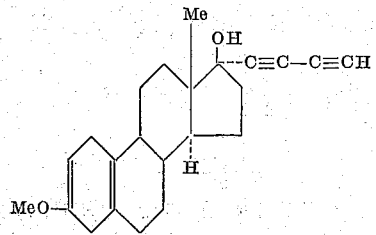

A solution of 3-methoxy-oestra-2,5(10)-dien-17-one (4.77 g.) (Colton, Nysted, Riegel and Raymond, J. Amer. Chem. Soc., 1957, 79, 1123) in anhydrous tetrahydrofuran (60 ml.) was added to a solution prepared from liquid ammonia (70 ml.), sodium (1.20 g.), ferric nitrate (0.02 g.) and 1,4-dichloro-but-2-yne (2.10 g.) by the method of Example 1. The solution was stirred under reflux for 2 hours and treated with solid ammonium chloride (2. g.) and the ammonia was allowed to evaporate. The residue was extracted with ether, the ethereal solution was washed, dried and evaporated under reduced pressure. The residual gum was purified from methanol containing a drop of pyridine to give crystalline 17α-butadiynyl-3-methoxy-oestra-2,5(10-dien-17β-ol, $[\alpha]_D^{22}$ (approximately) $+68°$ (c., 0.999 in dioxan A.R.), $\gamma_{max.}^{CCl_4}$ 3607, 3313, 2226, 2055, 1698, 1666, 1465, 1452, 1395, 1381 cm.$^{-1}$

EXAMPLE 5

*17α-Butadiynyl-19-Nor-Androst-4-En-17β-Ol-3-One*

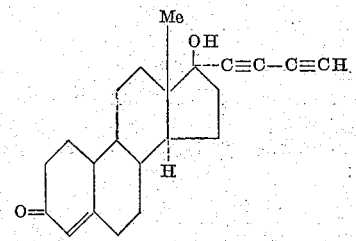

Dilute hydrochloric acid (3 N; 32 ml.) was added to a solution of 17α-butadiynyl-3-methoxy-oestra-2,5(10)-dien-17β-ol (0.80 g.) (see Example 4) in methanol (48 ml.) and the mixture was warmed at 60 to 65° C. for 15 minutes, cooled and poured into water. The precipitate was collected, washed, dried and purified by recrystallisation from methanol, yielding 17α-butadiynyl-19-nor-androst-4-en-17β-ol-3-one $[\alpha]_D^{20.5}$ $-93.5°$ (c., 0.978 in dioxan A.R.), $\lambda_{max.}^{EtOH}$ 240 mμ (ε 17090), $\lambda_{max.}^{CCl_4}$ 3606, 3309, 2227, 2055, 1678, 1620, 1451, 1381, 1330 cm.$^{-1}$

EXAMPLE 6

*17α-Butadiynyl-Androst-4-En-17β-Ol-3-One*

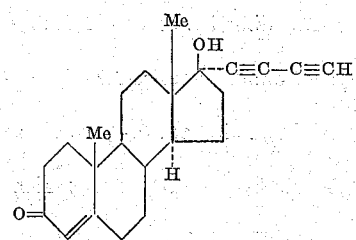

A solution of 3-ethoxy-androsta-3,5-dien-17-one (Riegel and Yu Cheng Liu, J. Org. Chem., 1951, 16, 1610), (14.9 g.) in anhydrous tetrahydrofuran (200 ml.) was added to a solution prepared from liquid ammonia (200 ml.), sodium (3.45 g.), ferric nitrate (0.05 g.) and 1,4-dichloro-but-2-yne (6.15 g.) by the method described in Example 1. The solution was stirred under reflux for 1 hour, treated with solid ammonium chloride (6 g.) and the ammonia was allowed to evaporate. The residue was extracted with ether, the ethereal solution was washed, dried and evaporated at reduced pressure, and yielded a gum, which was purified from methanol containing a drop of pyridine to give 17α-butadiynyl-3-ethoxy-androsta-3,5-dien-17β-ol;

$\gamma_{max}^{CCl_4}$ 3600, 3303, 2215, 2050, 1650, 1625, 1382

17α-butadiynyl-3-ethoxy-androsta-3,5-dien-17β-ol (0.50 g.) was dissolved in methanol (20 ml.), dilute hydrochloric acid (4 N; 10 drops) was added, and the mixture was allowed to stand for 1 hour at room temperature and then poured into water. The precipitate was collected, washed and dried. Purification from aqueous methanol gave 17α-butadiynyl-androst-4-en-17β-ol-3-one $[\alpha]_D^{22}$ $-32°$ (c., 1.003 in dioxan), $\gamma_{max.}^{Nujol}$ 3400, 3218, 2205, 2045, 1658, 1415

EXAMPLE 7

*17α-Butadiynyl-6-Methyl-Androst-5-En-3β,17β-Diol*

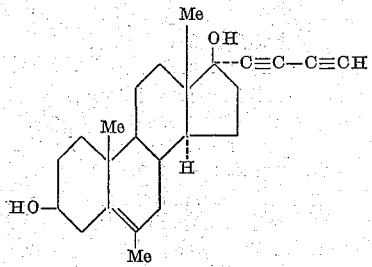

A solution of 6-methyl-dehydro-epi-androsterone (14.0 g.) (Grenville, Patel, Petrow, Stuart-Webb & Williamson, J. Chem. Soc., 1957, 4105; Petrow and Kirk, British Patent No. 840,477) in anhydrous tetrahydrofuran (100 ml.) was added to a solution prepared from liquid ammonia (200 ml.), sodium (3.45 g.), ferric nitrate (0.05 g.) and 1,4-dichloro-but-2-yne (6.15 g.) by the method of Example 1. The mixture was stirred under reflux for 1½ hours and treated with solid ammonium chloride (6 g.) and the ammonia was allowed to evaporate. After ether extraction, the ethereal solution was washed, dried, treated with charcoal and stripped under reduced pressure to give a residue which was purified from methanol yielding 17α-butadiynyl-6-methyl-androst-5-en-3β,17β-diol $\gamma_{max.}^{Nujol}$ 3570, 3325, 3180, 2220, 2045, 1241, 1086, 1041, 1012, 1002

EXAMPLE 8

*17α-Butadiynyl-3-Ethoxy-19-Nor-Androsta-3,5-Dien-17β-Ol*

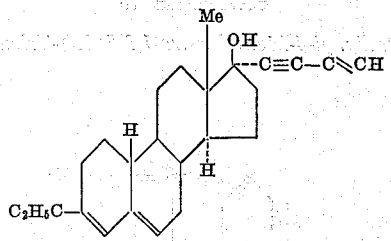

A solution of 3-ethoxy-19-nor-androsta-3,5-dien-17-one (Djerassi, Miramontes, Rosenkranz, Sondheimer, J. Amer. Chem. Soc., 1954, 76, 4092) (5.5 g.) in anhydrous tetrahydrofuran (75 ml.) was added to a solution prepared from liquid ammonia (100 ml.), sodium (1.38 g.), ferric nitrate (0.02 g.) and 1,4-dichloro-but-2-yne (2.46 g.) by the method of Example 1. The solution was stirred under reflux for 2 hours, and treated with solid ammonium chloride (3 g.), and the ammonia was allowed to evaporate. The product, isolated as in Example 7, was crystallised from methanol containing a drop of pyridine, affording 17α-butadiynyl-3-ethoxy-19-nor-androsta-3,5-dien-17β-ol, $\lambda_{max.}$ 242 mμ (ε 18,850)

$\gamma_{max.}^{CCl_4}$ 3607, 3313, 2226, 2055

EXAMPLE 9

*17αButadiynyl-3-Methoxy-6-Methyl-19-Nor-Androsta-3,5-Dien-17β-Ol*

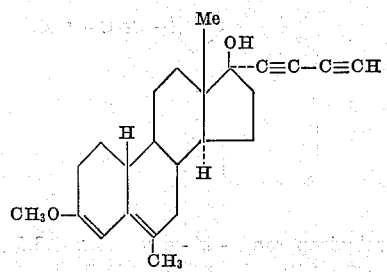

A solution of 3-methoxy-6-methyl-19-nor-androsta-3,5-dien-17-one (4.84 g.) (Belgian Patent No. 606,935) in anhydrous tetrahydrofuran (70 ml.) was added to a solution prepared from liquid ammonia (100 ml.), sodium (1.21 g.), ferric nitrate (0.01 g.) and 1,4-dichloro-but-2-yne (2.16 g.) by the method of Example 1. The solution was stirred under reflux for 2 hours, and treated with solid ammonium chloride (2.5 g.) and the ammonia was allowed to evaporate. Following ether extraction, the ethereal solution was washed, dried, treated with charcoal and stripped to give a gum, which was purified from methanol containing a drop of pyridine, yielding 17α-butadiynyl-3-methoxy-6-methyl - 19 - nor - androsta-3,5-dien-17β-ol, $\lambda_{max.}$ 247 mμ (ε 19,447).

EXAMPLE 10

*17α-Butadiynyl-Oestra-5(10)-En-17β-Ol-3-One*

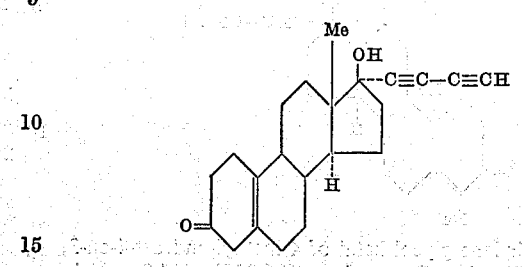

A solution of anhydrous oxalic acid (0.64 g.) in water (12 ml.) was added to a solution of 17α-butadiynyl-3-methoxy-oestra-2,5(10)-dien-17β-ol (0.83 g.) (Example 4) in methanol (200 ml.) and the mixture was allowed to stand at room temperature for 1 hour. Ether (400 ml.) was added. The mixture was shaken with aqueous sodium bicarbonate solution, and then with water, dried and stripped under reduced pressure. Purification from methanol yielded 17α-butadiynyl-oestra-5(10)-en-17β-ol-3-one, $\gamma_{max.}^{CCl_4}$ 3605, 3311, 2228, 2057, 1723 cm.$^{-1}$

EXAMPLE 11

*17α-Butadiynyl-6α-Methyl-Androst-4-En-17β-Ol-3-One*

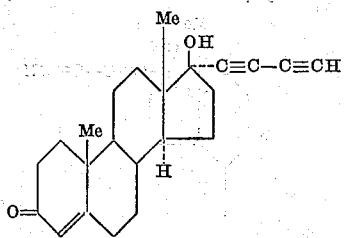

A solution of 3-ethoxy-6-methyl-androsta-3,5-dien-17-one (Belgian Patent No. 606,935) (14.3 g.) in anhydrous tetrahydrofuran (200 ml.) was added to a solution prepared from liquid ammonia (250 ml.), sodium (3.45 g.), ferric nitrate (0.05 g.) and 1,4-dichloro-but-2-yne (6.15 g.) by the method of Example 1. The solution was stirred under reflux for 1 hour and treated with solid ammonium chloride (6 g.) and the ammonia was allowed to evaporate. Following ether extraction, the ethereal solution was washed, dried, treated with charcoal and evaporated at reduced pressure, yielding a residue of 17α-butadiynyl-3-ethoxy-6-methyl-androsta-3,5-dien - 17β - ol. A portion was purified from methanol containing a trace of pyridine. The remainder, without further purification was dissolved in methanol (600 ml.). Dilute hydrochloric acid (3 N; 300 ml.) was added, and the mixture was maintained at 60° C. for 15 minutes, cooled, and poured onto ice. The precipitate was collected, washed with water, dried, and purified by recrystallisation from aqueous methanol yielding 17α-butadiynyl-6α-methyl-androst-4-en-17β-ol-3-one, $\gamma_{max.}^{CCl_4}$ 3606, 3311, 2225, 2055, 1676, 1610 cm.$^{-1}$

EXAMPLE 12

*17α-Butadiynyl-4-Methyl-Androst-4-En-17β-Ol-3-One*

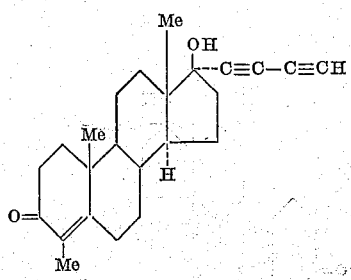

The 3-ethylene glycol ketal of 4-methyl-androst-4-en-3,17-dione (Belgian Patent No. 606,935) (14.8 g.) in anhydrous tetrahydrofuran (200 ml.) was added to a solution prepared by the method of Example 1 from liquid ammonia (200 ml.), sodium (3.45 g.), ferric nitrate (0.05 g.) and 1,4-dichloro-but-2-yne (6.15 g.) and the mixture was stirred under reflux for 1 hour. Solid ammonium chloride (6. g.) was added, and the ammonia was allowed to evaporate. After ether extraction, the ethereal solution was washed, dried, and evaporated at reduced pressure, yielding a residue of the 3-ethylene glycol ketal of 17α-butadiynyl-4-methyl-androst-4-en-17β-ol-3-one. Without being purified, this was dissolved in methanol (500 ml.). Dilute hydorchloric acid (4 N; 50 ml.) was added, and the mixture was allowed to stand for 1 hour at room temperature and then poured into water. The precipitate was collected, washed, dried and purified from aqueous methanol yielding 17α-butadiynyl-4-methyl-androst-4-en-17β-ol-3-one, $\gamma_{max.}^{Nujol}$ 3502, 3216, 2220, 2139, 1697, 1642 cm.$^{-1}$

EXAMPLE 13

*17α-Butadiynyl-Androsta-3,5-Dien-17β-Ol*

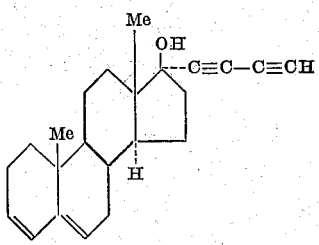

A solution of androsta-3,5-dien-17-one (2.5 g) (Rosenkranz, Kaufman and Romo, J. Amer, Chem. Soc., 1949, 71, 3689) in tetrahydrofuran (50 ml.) was added to a solution prepared from liquid ammonia (75 ml.), sodium (0.69 g.), ferric nitrate (0.01 g.) and 1,4-dichloro-but-2-yne (1.23 g.) by the method of Example 1. The mixture was stirred under reflux for 2 hours and treated with solid ammonium chloride (2 g.) and the ammonia was alowed to evaporate. The product, isolated with ether, was purified from aqueous methanol to give 17α-butadiynyl-androsta-3,5-dien-17β-ol.

EXAMPLE 14

*17α-Butadiynyloestra-1,3,5(10)-Trien-17β-Ol*

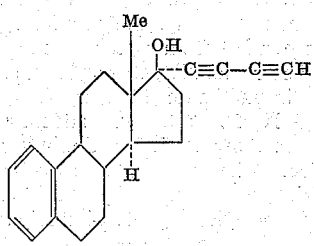

Oestra-1,3,5(10)-trien-17-one (5 g.) (U.S. Patent No. 2,947,763) in dry tetrahydrofuran (50 ml.) was treated with the sodium salt of butadiyne [prepared from sodium (1.75 g.), liquid ammonia (100 ml.), ferric nitrate (0.05 g.) and 1,4-dichloro-but-2-yne (3 g.)] according to the process of Example 1. The product obtained was isolated with ether and crystallised from aqueous acetone to give 17α-butadiynyl-oestra-1,3,5-(10)-trien-17β-ol as needles, M.P. 100 to 102° C., [α]$_D^{22}$—35.2° (c., 1.0 in chloroform), $\lambda_{max.}^{EtOH}$ 241.5 mμ (ε 377), 255.5 mμ and (ε 426), 266.5 mμ (ε 460), 274 mμ (ε 417), $\gamma_{max.}^{CCl_4}$ 3604, 3311, 2230 and 2061, cm.$^{-1}$

EXAMPLE 15

*17α-Butadiynyl-4-Methyloestra-1,3,5(10)-Trien-17β-Ol*

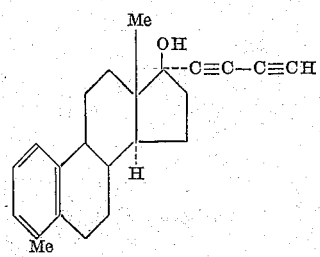

4-methyloestra-1,3,5(10)-trien-17-one (5 g.) (Gentles, Moss, Herzog and Hershberg, J. Amer. Chem. Soc., 1958, 80, 3702) in dry tetrahydrofuran (100 ml.) was treated with the sodium salt of butadiyne [prepared from sodium (1.75 g.), liquid ammonia (100 ml.), ferric nitrate (0.05 g.) and 1,4-dichloro-but-2-yne (3 g.)] according to the process of Example 1. The product was crystallised from aqueous methanol to give 17α-butadiynyl-4-methyloestra-1,3,5(10)-trien-17β-ol as plates, M.P. 145 to 148° C. with decomposition, $\gamma_{max.}^{CCl_4}$ 3600, 3305, 2225, 2055, 1590; $\gamma_{max.}^{CS_2}$ 780, 745

EXAMPLE 16

*17α-Butadiynyloestra-1,3,5(10)-Trien-3,17β-Diol*

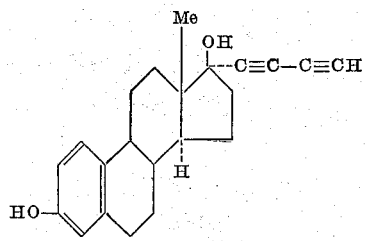

3 - (tetrahydropyranyl - 2' - oxy)oestra-1,3,5(10)-trien-17-one (10 g.) (prepared as in Belgian Patent No. 606,935) in dry tetrahydrofuran (200 ml.) was treated with the sodium salt of butadiyne [prepared from sodium (3.6 g.), liquid ammonia (200 ml.), ferric nitrate (0.1 g.) and 1,4-dichloro-but-2-yne (6.4 g.)] according to the process of Example 1.

The product was kept at room temperature for 6 hours in methanol (200 ml.) containing toluene-p-sulphonic acid (1 g.). The solution was poured into water, the steroidal material was extracted into ether, the extract was washed with dilute aqueous sodium bicarbonate and water, dried over anhydrous sodium sulphate and evaporated to dryness under reduced pressure. Crystallisation of the residue from benzene gave 17α-butadiynyloestra-1,3,5(10)-triene-3,17β-diol, M.P. 134 to 137° C. with decomposition, $\gamma_{max.}^{Nujol}$ 3261, 2227, 2100, 1615, 1552, 1496, 880

EXAMPLE 17

17α-Butadiynyl-19-Nor-Androst-4-En-17β-Ol

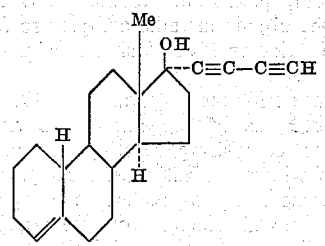

A solution of 19-nor-androst-4-en-17-one (12.1 g.) (British specification No. 811,961) in anhydrous tetrahydrofuran (250 ml.) was added to a solution prepared from liquid ammonia (300 ml.), sodium (3.45 g.), ferric nitrate (0.05 g.) and 1,4-dichloro-but-2-yne (6.15 g.) by the method of Example 1. The solution was stirred under reflux for 2 hours and treated with solid ammonium chloride (6 g.) and the ammonia was allowed to evaporate. The residue was extracted with ether, the ethereal solution was washed, dried, and evaporated under reduced pressure. The residual gum was purified from ether/hexane to give 17α-butadiynyl-19-nor-androst-4-en-17β-ol, $\gamma_{max.}^{CCl_4}$ 3602, 3305, 2227, 2057, 1665 cm.$^{-1}$

EXAMPLE 18

17α-Butadiynyl-5α-Androstan-17β-Ol-3-One

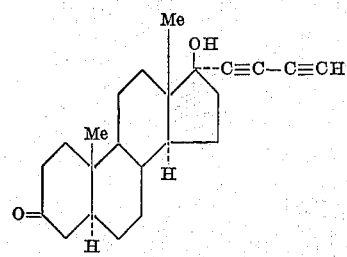

A solution of 3-methoxy-5α-androst-2-en-17-one (12.0 g.) (Belgian Patent No. 606,935, Example 20) in anhydrous tetrahydrofuran (300 ml.) was added to a solution prepared from liquid ammonia (300 ml.), sodium (3.45 g.), ferric nitrate (0.05 g.) and 1,4-dichloro-but-2-yne (6.15 g.) by the method of Example 1. The solution was stirred under reflux for 2 hours and treated with solid ammonium chloride (6 g.), and the ammonia was allowed to evaporate. The residue was extracted with ether, and the ethereal solution was washed, dried, treated with charcoal and stripped. The residual gum was dissolved in methanol containing 1% of concentrated hydrochloric acid, and the solution was heated under reflux for 10 minutes, cooled and diluted with water. The precipitate was collected, and purified from aqueous methanol, yielded 17α-butadiynyl-5α-androstan-17β-ol-3-one, $\gamma_{max.}^{CCl_4}$ 3607, 3310, 2228, 2057, 1715

EXAMPLE 19

17α-Butadiynyl-6α-Methyl-5α-Androstan-17β-Ol-3-One

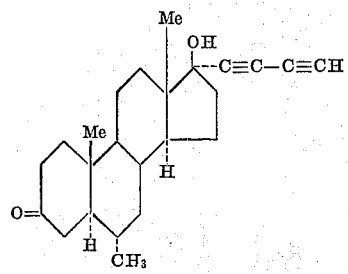

A solution of 3,3-dimethoxy-6α-methyl-5α-androstan-17-one (1.26 g.) (Belgian Patent No. 606,935) (Example 33) in anhydrous tetrahydrofuran (100 ml.) was added to a solution prepared from liquid ammonia (100 ml.) sodium (0.35 g.), ferric nitrate (0.01 g.) and 1,4-dichloro-but-2-yne (0.62 g.) by the method of Example 1. The solution was stirred under reflux for 2 hours and treated with solid ammonium chloride (1.5 g.), and the ammonia was allowed to evaporate. The residue was extracted with ether, and the ethereal solution was washed, dried, treated with charcoal, and stripped. The residual gum was dissolved in 1% methanolic hydrogen chloride and the solution was heated under reflux for 10 minutes, cooled and diluted with water. Purification of the precipitate from methanol containing a few drops of water yielded 17α - butadiynl-6α-methyl-5α-androstan-17β-ol-3-one, $\gamma_{max.}^{CCl_4}$ 3608, 3309, 2226, 2054, 1716

EXAMPLE 20

17α-Butadiynyl-4α-Methyl-5α-Androstan-17β-ol-3-One

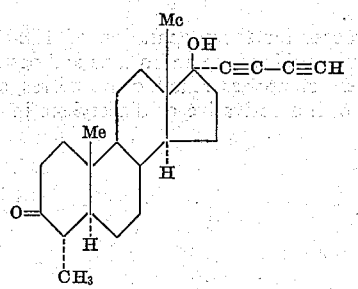

A solution of 3-methoxy-4α methyl-5α-androst-2-en-17-one (3.0 g.) (Belgian Patent No. 606,935, Example 21) in anhydrous tetrahydrofuran (100 ml.) was added to a solution prepared from liquid ammonia (120 ml.), sodium (0.69 g.) ferric nitrate (0.02 g.) and 1,4-dichloro-but-2-yne (1.23 g.) by the method of Example 1. The solution was stirred under reflux for 2 hours and treated with solid ammonium chloride (2 g.) and the ammonia was allowed to evaporate. The residue was extracted with ether, and the ethereal solution was washed, dried, treated with charcoal and stripped. The residue was heated under reflux for 10 minutes with 1% solution of hydrogen chloride in methanol, and the resulting solution was cooled and diluted with water. The precipitate was purified from aqueous methanol, yielding 17α-butadiynyl-4α-methyl-5α-androstan-17β-ol-3-one, $\gamma_{max.}^{CCl_4}$ 3606, 3311, 2227, 2056, 1718

We claim:
1. A 17α - butadiynyl-17β-hydroxy steroid compound selected from the group consisting of 17α-butadiynl-17β-hydroxy steroid compounds of the androstane and oestrane series.
2. 17α - butadiynyl - androst - 5 - en - 3β, 17β - diol.
3. 17α - butadiynyl - 3 - methoxy - oestra - 1,3,5(10) - trien-17β-ol.
4. 17α - butadiynyl - androst - 5 - en - 17β - ol.
5. 17α - butadiynyl - 3 - methoxy - oestra - 2,5(10) - dien-17β-ol.
6. 17α - butadiynyl - 19 - nor - androst - 4 - en - 17β - ol-3-one.
7. 17α - butadiynyl - 3 - ethoxy - androsta - 3,5 - dien - 17β-ol.
8. 17α - butadiynyl - androst - 4 - en - 17β - ol - 3 - one.
9. 17α - butadiynyl - 6 - methyl - androst - 5 - en - 3β, 17β, diol.
10. 17α - butadiynyl - 3 - ethoxy - 19 - nor - androsta - 3,5-dien-17β-ol.
11. 17α - butadiynyl - 3 - methoxy - 6 - methyl - 19 - nor-androsta-3,5-dien-17β-ol.
12. 17α - butadiynyl - oestra - 5(10) - en - 17β - ol - 3-one.

13. 17α-butadiynyl-3-ethoxy-6-methyl-androsta-3,5-dien-17β-ol.

14. 17α-butadiynyl-6α-methyl-androst-4-en-17β-ol-3-one.

15. 17α-butadiynyl-4-methyl-androst-4-en-17β-ol-3-one.

16. 17α-butadiynyl-androsta-3,5-dien-17β-ol.

17. 17α-butadiynyloestra-1,3,5(10)-trien-17β-ol.

18. 17α-butadiynyl-4-methyloestra-1,3,5(10)-trien-17β-ol.

19. 17α-butadiynyloestra-1,3,5(10)-trien-3,17β-diol.

20. 17α-butadiynyl-19-nor-androst-4-en-17β-ol.

21. 17α-butadiynyl-5α-androstan-17β-ol-3-one.

22. 17α-butadiynyl-6α-methyl-5α-androstan-17β-ol-3-one.

23. 17α-butadiynyl-4α-methyl-5α-androstan-17β-ol-3-one.

24. A process for the preparation of 17α-butadiynyl-17β-hydroxy steroids of the androstane and oestrane series which process comprises reacting the corresponding 17-oxo-steroid with a derivative of diacetylene in which one of the atoms of hydrogen has been replaced by an equivalent of a metal selected from the group consisting of lithium, sodium, potassium, calcium and magnesium, and treating the organo-metallic complex so formed with ammonium chloride to liberate said 17α-butadiynyl-17β-hydroxy steroid.

25. In a process for the preparation of 17α-butadiynyl-17β hydroxy steroids of the androstane and oestrane series, the step comprising reacting the corresponding 17-oxo-steroid with a derivative of diacetylene in which one of the atoms of hydrogen has been replaced by an equivalent of a metal selected from the group consisting of lithium, sodium, potassium, calcium and magnesium.

26. A process as claimed in cliam 25 wherein the 17-oxo-steroid is reacted with monosodio-butadiyne.

27. A process as claimed in claim 26 wherein the monosodio-butadiyne is prepared by treating 1,4-dichloro-but-2-yne in a refluxing solution of liquid ammonia with three molecular proportions of sodamide.

28. A process as claimed in claim 25 wherein the 17-oxo steroidal starting material is dissolved in tetrahydrofuran.

No references cited.